(12) United States Patent
Brun et al.

(10) Patent No.: US 8,534,058 B2
(45) Date of Patent: Sep. 17, 2013

(54) ENERGY STORAGE AND PRODUCTION SYSTEMS, APPARATUS AND METHODS OF USE THEREOF

(75) Inventors: Klaus Brun, Helotes, TX (US); Melissa A. Wilcox, San Antonio, TX (US); Eugene L. Broerman, III, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 739 days.

(21) Appl. No.: 12/780,211

(22) Filed: May 14, 2010

(65) Prior Publication Data

US 2011/0277457 A1    Nov. 17, 2011

(51) Int. Cl.
*F16D 31/02* (2006.01)
(52) U.S. Cl.
USPC .............................................. 60/408; 60/415
(58) Field of Classification Search
USPC ................... 60/408, 413, 415, 370, 371, 398; 310/12.1, 12.2; 290/1 R; 91/165
See application file for complete search history.

(56) References Cited

U.S. PATENT DOCUMENTS

| 7,557,473 | B2 | 7/2009 | Butler | |
|---|---|---|---|---|
| 7,832,207 | B2* | 11/2010 | McBride et al. | 60/410 |
| 2006/0285984 | A1* | 12/2006 | Liu et al. | 417/418 |
| 2007/0272178 | A1 | 11/2007 | Brun et al. | |
| 2009/0021012 | A1 | 1/2009 | Stull et al. | |
| 2009/0091195 | A1 | 4/2009 | Hyde et al. | |
| 2010/0219798 | A1* | 9/2010 | Namuduri et al. | 322/3 |

OTHER PUBLICATIONS

20% Wind Energy by 2030—Increasing Wind Energy's Contribution to U.S. Electricity Supply, U.S. Department of Energy, Energy Efficiency and Renewable Energy, Jul. 2008, 248 pages.
Bloomfield, Linear Motor Free Piston Compressor—Final Report, U.S. Army Research Office, Reference : P-30443-CH-S, Feb. 17, 1995, 30 pages.
Brun, et al., Field Testing of a Semi-Active Valve for Reciprocating Compressors, 2008 GMRC Gas Machinery Conference. Oct. 6-8, 2008, 12, pages.
Gyuk, et al., EPRI-DOE Handbook of Energy Storage for Transmission and Distribution Applications, Technical Report, U.S. Department of Energy, Dec. 2003, 518 pages.
Rastler, Electric Energy Storage an Essential Asset to the Electric Enterprise—What is New in the Storage Landscape?, EPRI | Electric Power Research Institute, Jan. 22, 2009, 40 pages.
Schoenung, Characteristics and Technologies for Long- vs. Short-Term Energy Storage—A study by the DOE Energy Storage Systems Program, Sandia Report, SAND2001-0765, Sandia National Laboratories, Mar. 2001, 46 pages.

* cited by examiner

*Primary Examiner* — Edward Look
*Assistant Examiner* — Logan Kraft
(74) *Attorney, Agent, or Firm* — Grossman, Tucket et al.

(57) ABSTRACT

Systems, apparatus and methods of compressed air energy storage and electrical power generation are provided. In one embodiment, an apparatus is provided having a magnetic piston within a cylinder and an air chamber at each end of the piston; an electromagnetic coil is operable with the piston to convert an input of electrical power to a first reciprocating movement of the piston sufficient to generate compressed air in the chambers for storage in a compressed air storage reservoir; and the electromagnetic coil is operable with the piston to convert a second reciprocating movement of the piston to an output of electrical power connectable to a power grid, with the second reciprocating movement of the piston generated by bursts of the compressed air from the storage reservoir introduced into the chambers.

23 Claims, 5 Drawing Sheets

ENERGY STORAGE AND PRODUCTION SYSTEMS, APPARATUS AND METHODS OF USE THEREOF

FIELD OF THE INVENTION

The present invention relates to energy storage and production and, more particularly, to systems, apparatus and methods of using electrical power to generate compressed air for compressed air energy storage, and thereafter using the compressed air to generate electrical power for a power grid.

BACKGROUND

Grid connected energy storage appears to be gaining interest from utility companies seeking to secure a more stable energy source without the use of expensive peaking plants, as is the current tradition.

Power demand profiles often vary significantly throughout the day, and to meet peak demand, electricity providers often size equipment for peak demand rather than average demand. In turn, higher peak power rates are charged to power consumers as a result of the increase in per unit cost to generate peak demand power.

In light of the foregoing, a benefit of grid connected energy storage may be the ability to better level the demand curve, by using alternative fluctuating energy sources at off peak hours to store energy for use during peak hours. However, as indicated above, commercial implementation of such devices appears to be limited, with peaking plants historically being favored over storage technologies.

Now, in addition to the high cost of peaking plants, more recent concerns over reducing the generation of greenhouse gases, as well as energy shortages (e.g. rolling "brown outs") particularly in U.S. coastal markets, has also increased interest for the use of a "smart grid". Such a grid may use a combination of advanced metering, load prediction, and increased electricity production efficiency to satisfy increasing energy demands while minimizing environmental impact.

As part of a smart grid, it may be desirable to use renewable energy sources (i.e. energy from natural resources such as wind, sunlight (solar), rain, tides and geothermal heat), as an alternative to petroleum-based fuels to provide reductions in greenhouse gas emissions. However, many renewable energy sources may not provide the same level of constant power as petroleum-based fuels, and often produce power at off-peak hours when it is not necessarily needed. In other words, the existence of renewable energy sources may fluctuate widely during the day, the existence of which may not be controllable. For example, while electrical power generated from solar radiation may exist during the daylight hours, such solar radiation and corresponding electrical power may not exist at night. Consequently, with greater use of renewable sources, electricity providers may be faced with further increasing the number of installed peaking plants, or use a form of energy storage for power supply smoothing.

There are several advantages that can be realized with increased used of energy storage. The dependence on expensive peaking power plants for peak electricity demand can be reduced. Storage will aid to smooth power production due to fluctuating energy supplies and varying energy demand throughout the day. This will level the demand curve and allow excess energy to be stored during off-peak hours. Energy storage will also allow the majority of plants to be designed and operated at their best efficiency points. The plants will not need extra operation capacity to meet peak demands.

As indicated above, one advantage of energy storage is that may provide a means to enable the use of energy sources with greater fluctuations, such as may be encountered with certain renewable energy sources. Energy storage may be used to bridge the gap between renewable energy production and peak energy demand. Furthermore, to better enable use of a smart grid, energy storage may be used in load leveling, enabling distributed technologies, and increasing the "plant to user" electrical efficiency required to supply the increasing demand on electrical grids.

In order to realize several of the advantages of energy storage listed above (provide excess power during peak demand, store large amounts of energy during off-peak hours from fluctuating energy sources) a large storage capacity is needed. There is a requirement for quick response to electrical grid fluctuations, but in general a long term supply is needed to meet power demand.

One technology that may be used for energy storage is compressed air energy storage (CAES). CAES may be used to store or smooth mechanical or electrical energy from fluctuating power sources, such as wind turbines or solar photovoltaic panels. Unlike chemical storage, CAES is not understood to utilize expensive (exotic) materials, degrade over time (like batteries), or create an environmental recycling/disposal/landfill problem.

Traditional CAES systems may utilize centrifugal compressors and radial inflow turbines for the compression and expansion processes. Unfortunately, these machines suffer from not having high efficiency, which is undesirable. Furthermore, to avoid large storage tanks for CAES storage (if air is not stored in a geological formation), very high air pressures are desired, which make the usage of centrifugal compressors difficult because multiple stages with individual wheels, bearings, and seals are required to achieve to high pressures with centrifugal compressors.

Alternatively, conventional reciprocating compressors have not been understood to be used in CAES applications given the devices appear to have had some mechanical and pulsation limitations that can result in low reliability and high maintenance costs. These limitations are understood as follows:

Conventional reciprocating compressors and expanders utilize a double-acting piston (inside a cylinder) connected to a rod, crankshaft, coupling, and motor/generator. This arrangement is mechanically complex and inefficient as it consists of multiple moving parts that require bearings, seals, and lubrication.

Conventional reciprocating compressors/expanders utilize mechanical check-valves that are prone to fail under high-cycle fatigue. These valves are understood to be a cause of failures and downtime of reciprocating compressors. Also, in high-speed reciprocating compression, the high velocities of the gas may cause significant valve losses which reduce the efficiency of compression.

Pulsations generated by a conventional reciprocating compressor have to be dampened using bottles, orifice plates, choke tube, and Helmholtz resonators, which add cost, complexity, and efficiency losses to the compressor.

Due to the many moving parts of a conventional reciprocating compressor/expander, speed variation and, therefore, flow capacity control is difficult, as each moving part has its own natural vibration frequency and high-cycle fatigue limitation.

However, the foregoing limitations of conventional reciprocating machinery may be overcome with the new inventions disclosed herein. Furthermore, the new inventions disclosed herein may raise CAES storage-conversion process efficiencies. Thus, a prior limitation of CAES technology, specifically low storage-conversion efficiency, may be resolved using new and advanced technology as described hereinafter.

SUMMARY

It is an object of the present invention to provide systems, apparatus and methods of use thereof to overcome the foregoing limitations of CAES storage-conversion process inefficiencies and compressed air storage/expansion machinery.

It is another object of the present invention to provide energy storage and production systems, apparatus and methods of use thereof which may utilize a limited number of moving pieces to reduce the device complexity and storage-conversion process inefficiencies of conventional CAES.

It is another object of the present invention to provide energy storage and production systems, apparatus and methods of use thereof which may increase CAES storage-conversion efficiencies.

In is another object of the present invention to provide an apparatus having a magnetic piston within a cylinder and an air chamber at each end of the piston; an electromagnetic coil is operable with the piston to convert an input of electrical power to a first reciprocating movement of the piston sufficient to generate compressed air in the chambers for storage in a compressed air storage reservoir; and the electromagnetic coil is operable with the piston to convert a second reciprocating movement of the piston to an output of electrical power connectable to a power grid, with the second reciprocating movement of the piston generated by bursts of the compressed air from the storage reservoir introduced into the chambers.

It is another object of the present invention to provide an energy storage and production apparatus comprising a free magnetic piston within a cylinder, the free magnetic piston comprising a permanent magnet; a first chamber provided between a first end of the piston and a first end of the cylinder and a second chamber provided between a second end of the piston and a second end of the cylinder; an electromagnetic coil connectable to an input of electrical power and operable with the piston to generate a first reciprocating movement of the piston sufficient to generate compressed air in the first and second chambers to be stored in a compressed air storage reservoir; and the electromagnetic coil operable with the piston to convert a second reciprocating movement of the piston to an output of electrical power connectable to a power grid, the second reciprocating movement of the piston generated by bursts of the compressed air from the storage reservoir introduced into the first and second chambers. The foregoing energy storage and production apparatus may also be part of an energy storage and production system, or a It is another object of the present invention to provide a method of energy storage and production, particularly with the foregoing energy storage and production apparatus. For energy storage, the method comprises providing an input of electrical power; connecting the electromagnetic coil to the input of electrical power and operating the electromagnetic coil with the piston to generate the first reciprocating movement of the piston; introducing air into the first chamber and the second chamber; compressing the air in the first chamber and the second chamber with the first reciprocating movement of the piston; and transferring the air compressed in the first chamber and the second chamber to the compressed air storage reservoir for energy storage. For energy production, the method comprises introducing bursts of compressed air from the storage reservoir into the first and second chambers to generate the second reciprocating movement of the piston; and operating the electromagnetic coil with the piston to convert a second reciprocating movement of the piston to an output of electrical power connectable to a power grid.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

It may be appreciated that the present disclosure is not limited in its application to the details of construction and the arrangement of components set forth in the following description or illustrated in the drawings. The embodiments herein may be capable of other embodiments and of being practiced or of being carried out in various ways. Also, it may be appreciated that the phraseology and terminology used herein is for the purpose of description and should not be regarded as limiting as such may be understood by one of skill in the art.

Figure 1:
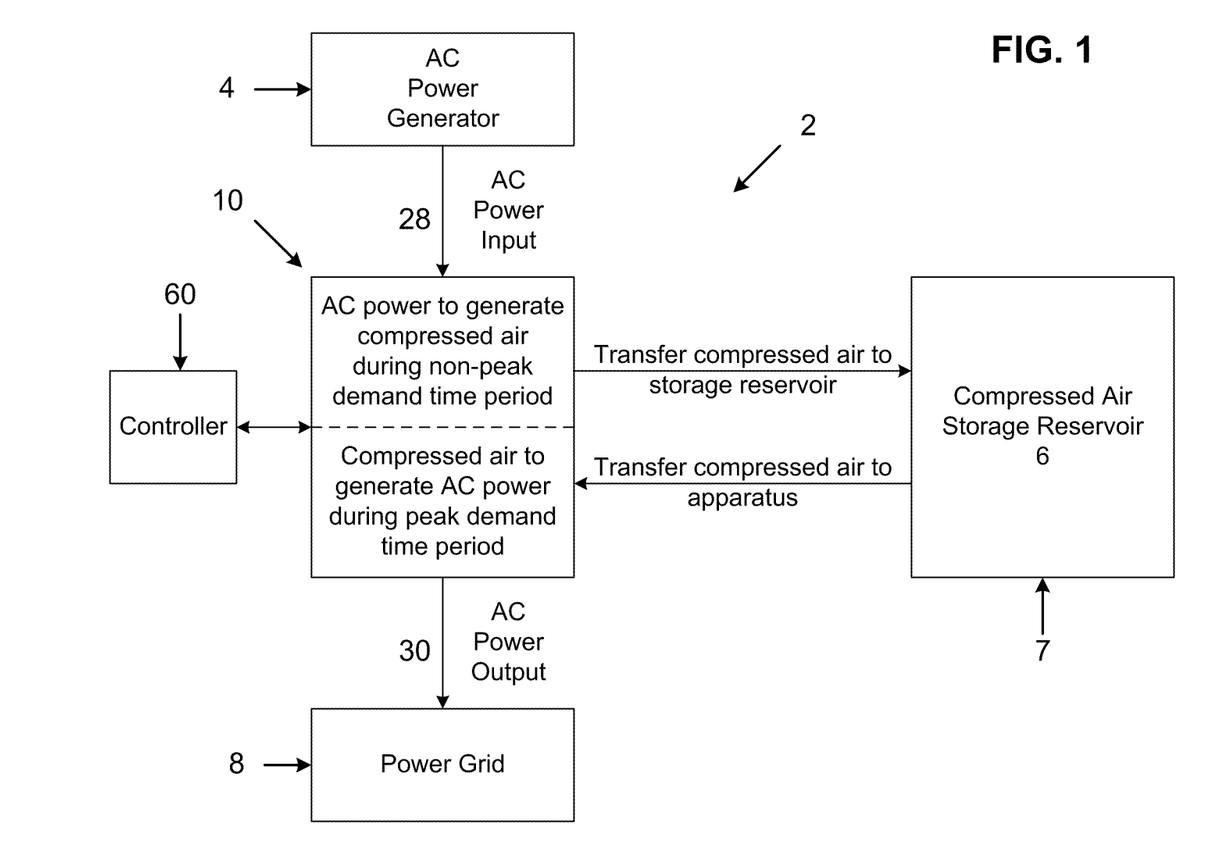
FIG. 1 is a block diagram of an energy storage and production system with an energy storage and production apparatus according to one embodiment of the present invention.

Turning to the figures, FIG. 1 shows an energy storage and production system 2. Energy storage and production system 2 may include an AC (alternating current) power generator 4, which may be, for example, a turbine (such as a wind turbine) which may generate AC power from a renewable energy source such as wind. As shown in FIG. 1, energy storage and production system 2 may also include a compressed air storage reservoir 6 which may be contained in a containment device 7 (such as a chamber provided by a tank, or a nature or man-made underground formation which may have access from the surface of the ground or from the sea (e.g. cave, cavern, mine); a power grid 8 which may provide electrical power to consumers; and an energy storage and production apparatus 10 which will now be explained in greater detail.

Figure 2:
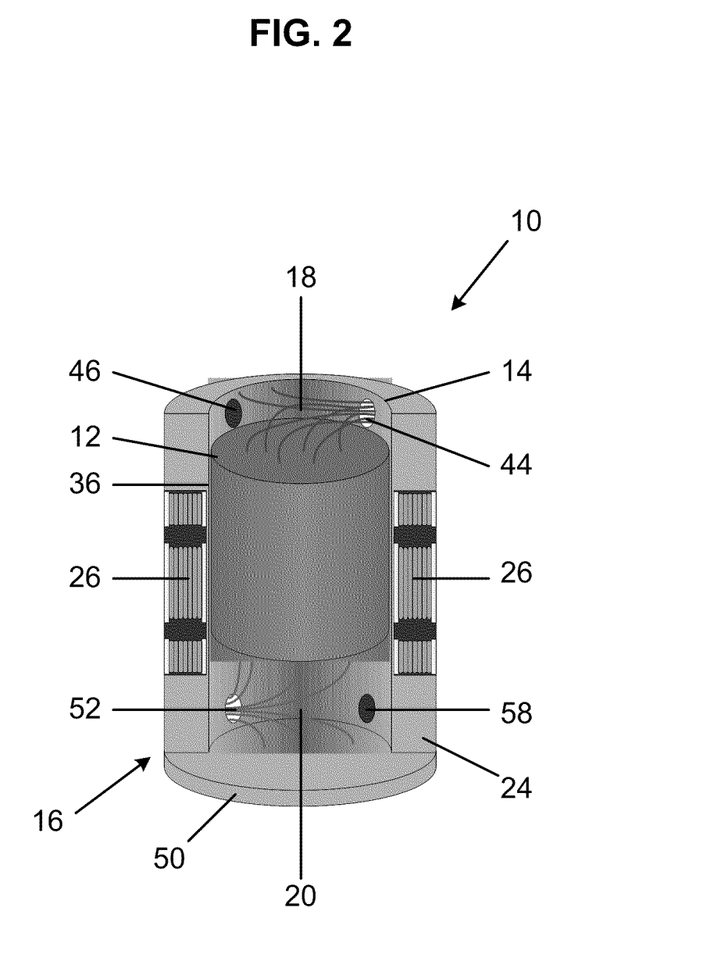
FIG. 2 is a cross-sectional perspective view of one embodiment of the energy storage and production apparatus of FIG. 1 with air passages arranged at the ends of the cylinder on the side-wall thereof.
Figure 3:
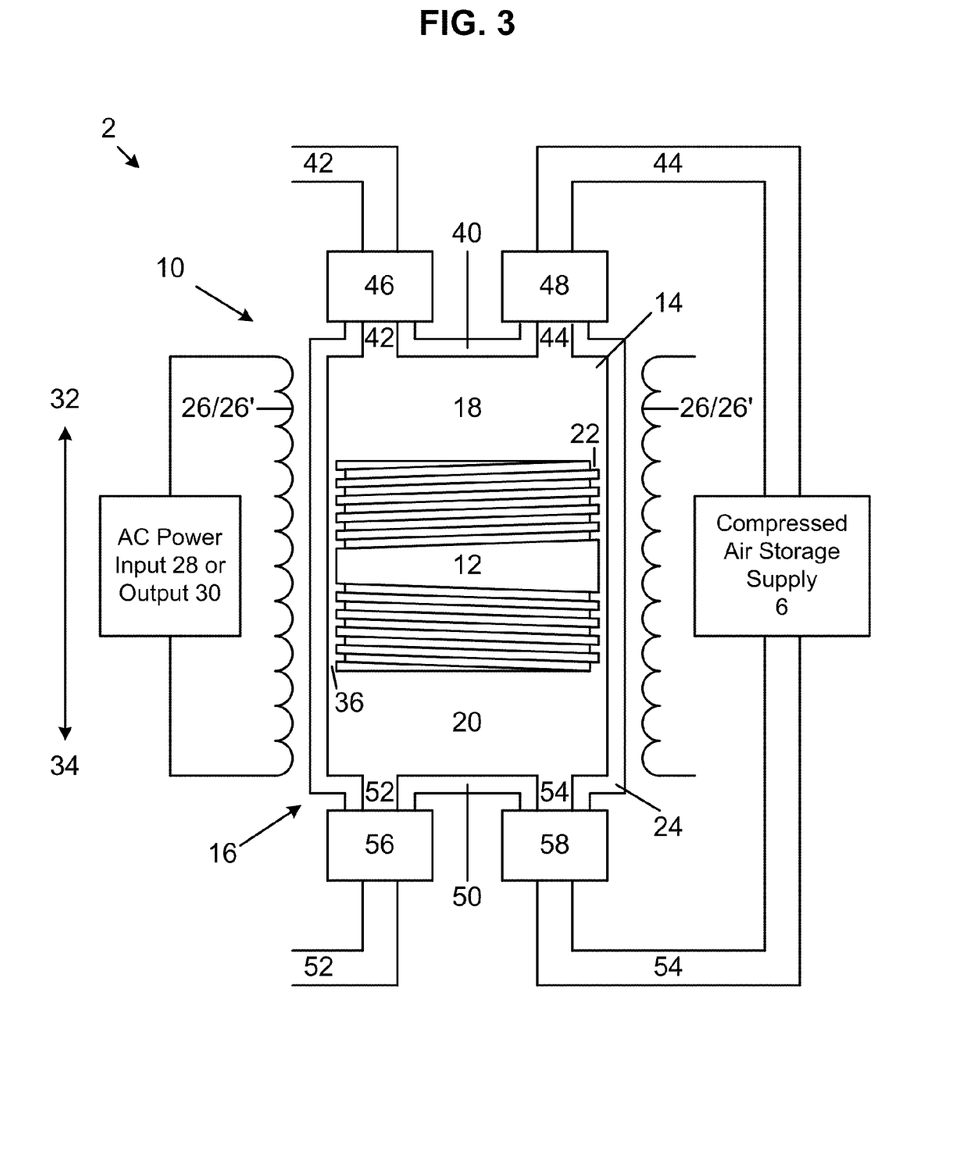
FIG. 3 is a cross-sectional view of the energy storage and production apparatus of FIG. 2 with air passages and valve devices arranged at the ends of the cylinder on the opposing end-walls thereof and a piston in the center.

As shown in FIGS. 2 and 3, energy storage and production apparatus 10 may include a cylindrical free piston 12. In other words, piston 12 is not connected to a crankshaft to control the motion thereof (and may also be termed as being crankless). Piston 12 may be slidably disposed within cylindrical cavity 14 as to divide cavity 14 into two opposing end chambers 18, 20. Depending upon the application, piston 12 may have a diameter of any suitable size. For example, the diameter may range from 2 inches to 50 inches.

In addition to the foregoing, free piston 12 may particularly be magnetic. Magnetic piston 12 may particularly include a permanent magnet 22 and, if magnetic piston 12 is wholly a permanent magnet, magnetic piston 12 may be characterized as a permanent magnet piston. The permanent magnet may particularly be formed from a ferromagnetic or ferrimagnetic material which has been magnetized and retains the magnetization after an external magnetic field is removed. The permanent magnet may be coated with a coating to prevent wear or provide other desirable characteristics.

Cylinder 16, which surrounds the piston 12, may comprise a side-wall 24, as well as end-walls 40 and 50, which at least partially define cavity 14. Cylinder 16 may be formed of a non-ferromagnetic material, which may be further characterized as being paramagnetic or diamagnetic. Examples of non-ferromagnetic material include non-ferromagnetic metal (e.g. aluminum, copper, gold, lead, magnesium, platinum, silver, titanium and tungsten), ceramic and plastic. The side-wall 24 of cylinder 16 a piston 12 are separated by a narrow gap 36 which may provide location for an air film bearing between cylinder 16 and piston 12. In order to inhibit air leakage within gap 36 between cylinder and piston 12, as well as provide better air lubrication, piston 12 may include at least one groove 22 which biases gap 36. As shown groove 22 is helical and may operate such that when piston 12 may be rotating (spinning), air which enters the gap 36 may be directed back towards the end chamber 18, 20 from which it originated.

Energy storage and production apparatus 10 may further comprise at least one electromagnetic coil 26 configured and adapted to be electrically coupled to an AC power input 28 when energy storage and production apparatus 10 is to be used similar to AC motor/air compressor, or provide an AC power output 30 when energy storage and production apparatus 10 is to be used similar to a compressed air expander/AC power generator as described in greater detail below. Depending upon the application, the AC power output of the energy storage and production apparatus 10 may reach megawatt levels.

As shown, electromagnetic coil 26 may be wrapped or otherwise configured around magnetic piston 12. Electromagnetic coil 26 may be part of side-wall 24 (FIG. 2), or may be wrapped or otherwise configured around the outside of side-wall 24 (FIG. 3). Electromagnetic coil 26 may more particularly comprise counter-wound conductor coils embedded into side-wall 24.

Electromagnetic coil 26 may be particularly wrapped around or otherwise configured to be operable with magnetic piston 12 in such arrangement that, when electromagnetic coil 26 is connected with AC power from AC power input 28, magnetic piston 12 will move, as understood by electromagnetic induction, in two opposing linear directions 32 and 34 to provide reciprocating movement within cylinder 16. More particularly, magnetic piston 12 may be understood to change direction when the electrical charge of the alternating current changes direction. The level of AC power from AC power input 28 may be controlled by a variable speed drive to vary the speed of the piston 12.

Furthermore, electromagnetic coil 26 or a second electromagnetic coil 26' may be wrapped around or otherwise configured to operate with magnetic piston 12 in such arrangement that, when electromagnetic coil 26 or 26' is connected with AC power from AC power input 28, magnetic piston 12 will rotate (spin), as understood by electromagnetic induction, in either a clockwise or counterclockwise direction within cylinder 16.

Energy storage and production apparatus 10 further may include a low pressure air passage 42 and a high pressure air passage 44 adjacent first end-wall 40 of cylinder 16 and which are in fluid communication with first chamber 18. Low pressure air passage 42 and high pressure air passage 44 may be opened and closed by valve devices 46 and 48, respectively, which may more particularly comprise bidirectional valves. In other words, valves permitting air flow in opposing directions. Valve devices 46, 48 may also comprise fully active suction/discharge valves.

Energy storage and production apparatus 10 further may include a low pressure air passage 52 and a high pressure air passage 54 adjacent a second end-wall 50 of cylinder 16 and which are in fluid communication with second chamber 20. Low pressure air passage 52 and high pressure air passage 54 may be opened and closed by valve devices 56 and 58, respectively, which may also more particularly comprise bidirectional valves. Valve devices 56, 58 may also comprise fully active suction/discharge valves.

The air passages 42, 44, 52, 54 may be provided by various structures, such as the lumen of a conduit/pipe or ports of a cylinder head. Furthermore, as shown below, air passages 42, 44, 52 and 54 may all be considered bidirectional air passages. In other words, air flow may flow in a first direction or a second direction (opposing the first direction) at different times. The operation and certain uses of energy storage and production apparatus 10 will now be explained in greater detail.

Energy storage and production apparatus 10 may be used to convert electrical power to mechanical motion or, alternatively, mechanical motion to electrical power. As indicated above, when electromagnetic coil 26 is connected with AC power from AC power input 28, magnetic piston 12 will move, as understood by electromagnetic induction, in two opposing linear directions 32 and 34 to provide reciprocating movement within cylinder 16. Working in operation with valve devices 46, 48, 56 and 58 to open and close air passages 42, 44, 52 and 54, respectively, magnetic piston 12 may generate compressed air within chambers 18, 20 to be stored in a compressed air storage reservoir 6.

In the foregoing manner, energy storage and production apparatus 10 may be used similar to an AC motor/air compressor. Alternatively, energy storage and production apparatus 10 may be used as a compressed air expander/AC power generator to provide AC power. Such may be performed by controlling the opening and closing of valve devices 46, 48, 56, 58 to provide bursts of compressed air from compressed air storage reservoir 6 introduced into first and second chambers 18, 20 in such a sequence as to move magnetic piston 12 within cylinder 16 with a similar reciprocating movement as used to compress air, thus creating an AC power output 30 from electromagnetic coil 26, as understood by electromagnetic induction, due to the movement of magnetic piston 12. In this manner, the electromagnetic coil 26 is operable with piston 12 to convert a second reciprocating movement of the piston 12 to an output of electrical power connectable to power grid 8.

Figure 4:
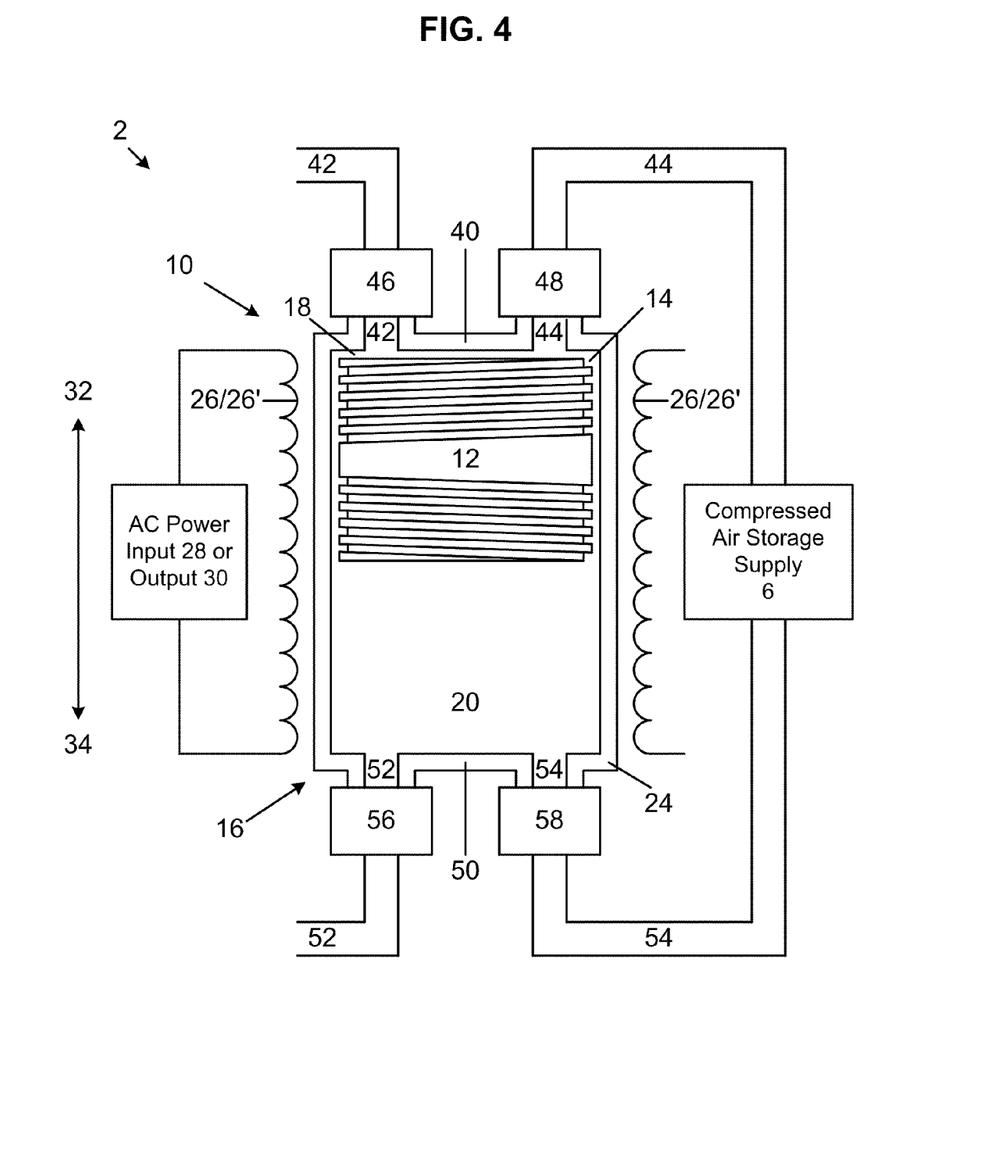
FIG. 4 is a cross-sectional view of the energy storage and production apparatus of FIG. 3 with the piston at a first end of the cylinder.

Turning to FIG. 4, when energy storage and production apparatus 10 is used to compress air, and piston 12 is closest end-wall 40 of cylinder 16 (during the time period between when piston 12 stops moving in direction 32 and before it starts moving in direction 34), valve device 48, which may be understood to be on the higher pressure (air storage) side of system 2 and apparatus 10, may close high pressure air passage 44. Simultaneously, or a fraction of time thereafter, valve device 46, which may be understood to be on the lower pressure (air intake/discharge) side of system 2 and apparatus 10, may open low pressure air passage 42 in preparation for an intake of low pressure air into chamber 18 (i.e. air at a pressure lower than the air pressure within compressed air storage reservoir 6, such as air at atmospheric pressure).

Additionally, also when piston 12 is closest end-wall 40 of cylinder 16, piston 12 is furthest from end-wall 50 of cylinder. At this time (i.e. during the time period between when piston 12 stops moving in direction 32 and before it starts moving in direction 34) valve device 56 on the lower pressure (air intake/discharge) side of system 2 and apparatus 10 may close low pressure air passage 52 in preparation to compress low pressure air now in chamber 20. Also, it is noted that valve device 58 on higher pressure (air storage) side of the system 2 and apparatus 10 may close high pressure air passage 54 when piston travels in direction 32.

Now, as piston 12 begins to travel in direction 34, the size of chamber 18 increases during an intake stroke of piston 12 relative to chamber 18, and chamber 18 intakes low pressure air from the lower pressure (air intake/discharge) side of the system 2 and apparatus 10 through low pressure air passage 42. Simultaneously, at the other end of cylinder 16, the size of chamber 20 decreases during a compression stroke of piston 12 relative to chamber 20, and piston 12 compresses air therein which was introduced through low pressure air passage 52 when valve device 56 was open and piston 12 was traveling in direction 32. When the air pressure within chamber 20 reaches a predetermined minimum threshold on the higher pressure (air storage) side of the system 2 and apparatus 10, which may be equal to the air pressure of the compressed air storage reservoir 6, valve device 58 on the higher pressure (air storage) side of the system 2 and apparatus 10 may open high pressure air passage 54 and the air compressed in chamber 20 may now be introduced into the compressed air storage reservoir 6. Depending upon application, exemplary pressures in the cylinder 16 and reservoir may reach 20,000 psi or higher.

Figure 5:
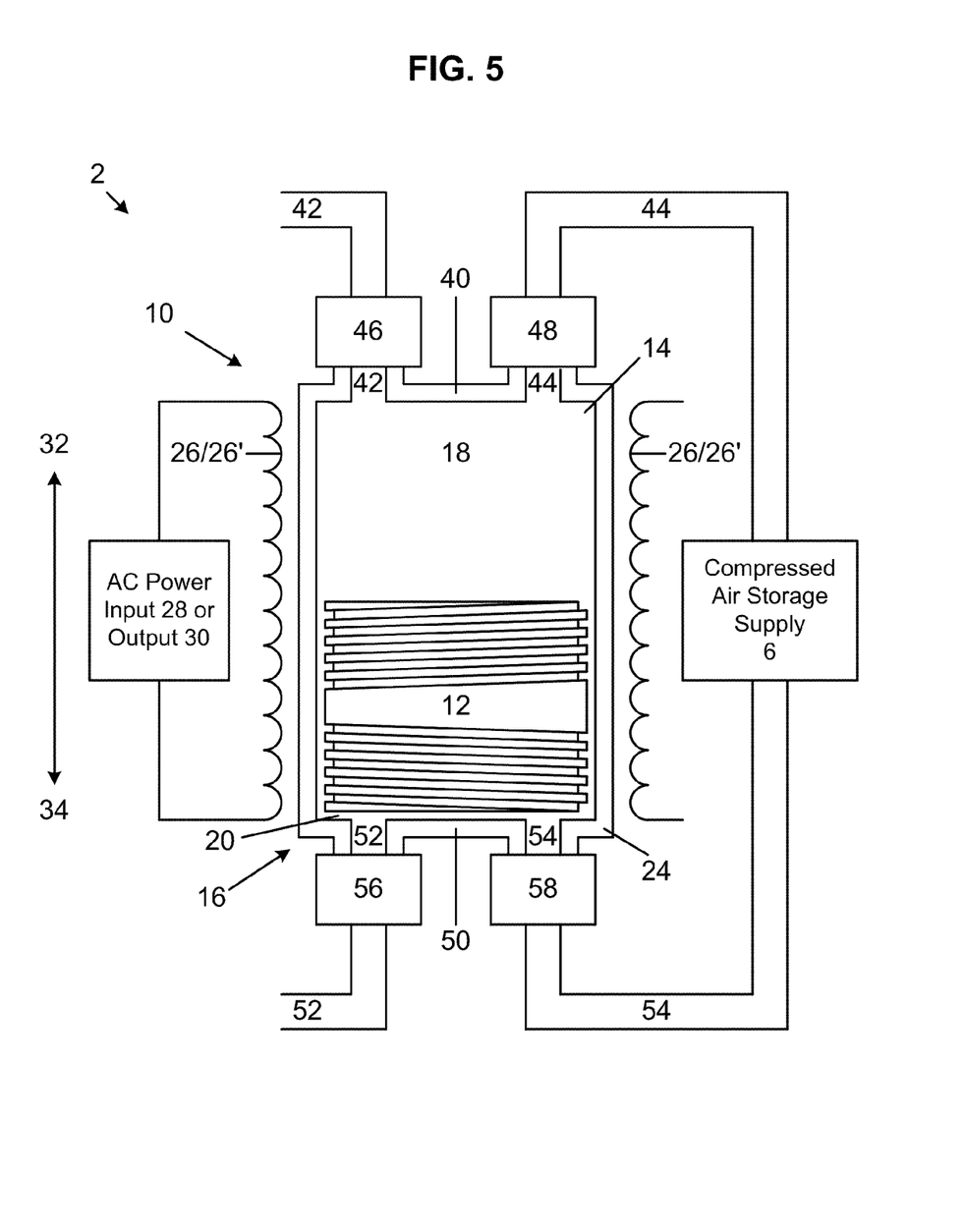
FIG. 5 is cross-sectional view of the energy storage and production apparatus of FIG. 3 of the piston at a second end of the cylinder.

As shown in FIG. 5, when piston 12 reaches the end of its travel in direction 34 and is closest end-wall 50 of cylinder 16 (during the time period between when piston 12 stops moving in direction 34 and before it starts moving in direction 32), valve device 58, which may be understood to be on the higher pressure (air storage) side of system 2 and apparatus 10, may close high pressure air passage 54. Simultaneously, or a fraction of time thereafter, valve device 56, which may be understood to be on the lower pressure (air intake/discharge) side of system 2 and apparatus 10, may open low pressure side passage 52 in preparation for an intake of low pressure air into chamber 20 (i.e. air at a pressure lower than the air pressure within compressed air storage reservoir 6, such as air at atmospheric pressure).

Additionally, also when piston 12 is closest end-wall 50 of cylinder 16, piston 12 is furthest from closed end 40 of cylinder. At this time (i.e. during the time period between when piston 12 stops moving in direction 34 and before it starts moving in direction 32) valve device 46 on the lower pressure (air intake/discharge) side of system 2 and apparatus 10 may close low pressure air passage 42 in preparation to compress low pressure air now in chamber 18. Also, it is noted that valve device 48 on higher pressure (air storage) side of the system 2 and apparatus 10 may close high pressure air passage 44 when piston travels in direction 34.

Now, as piston 12 begins to travel in direction 32, the size of chamber 20 increases during an intake stroke of piston 12 relative to chamber 20, and chamber 20 intakes low pressure air from the lower pressure (air intake/discharge) side of the system 2 and apparatus 10 through low pressure air passage 52. Simultaneously, at the other end of cylinder 16, the size of chamber 18 decreases during a compression stroke of piston 12 relative to chamber 18, and piston 12 compresses air therein which was introduced through low pressure air passage 42 when valve device 46 was open and piston 12 was traveling in direction 34. When the air pressure within chamber 18 reaches a predetermined minimum threshold on the higher pressure (air storage) side of the system 2 and apparatus 10, which may be equal to the air pressure of the compressed air storage reservoir 6, valve device 48 on the higher pressure (air storage) side of the system 2 and apparatus 10 may open high pressure air passage 44 and the air compressed in chamber 18 may now be introduced into the compressed air storage reservoir 6. When piston 12 reaches the end of its travel in direction 32, the foregoing cycle may be repeated.

Having explained the operation of energy storage and production apparatus 10 when it is used as an AC motor/air compressor, the utility of energy storage and production apparatus 10 when used as a compressed air expander/AC power generator will now be explained.

When the energy and storage apparatus 10 is used as an AC motor/air compressor, it is connected to AC power input 28. However, when energy and storage apparatus 10 ceases to be used as an AC motor/air compressor, it may be disconnected from AC power input 28. In turn, when energy and storage apparatus 10 is used as a compressed air expander/AC power generator, it may be connected to power grid 8 to provide AC power thereto. Similarly, when energy and storage apparatus 10 ceases to be used as an air expander/AC power generator, it may be disconnected from power grid 8.

Returning to FIG. 4, when energy storage and production apparatus 10 is used as a compressed air expander/AC power generator, and piston 12 is closest closed end 40 of cylinder 16 (during the time period between when piston 12 stops moving in direction 32 and before it starts moving in direction 34), valve device 46 on the lower pressure (air intake/discharge) side of the system 2 and apparatus 10 may close low pressure air passage 42. Simultaneously, or a fraction of time thereafter, valve device 48 on the higher pressure (air storage) side of the system 2 and apparatus 10 may open high pressure air passage 44 to introduce a burst of compressed air into chamber 18 from compressed air storage reservoir 6.

Additionally, also when piston 12 is closest end-wall 40 of cylinder 16, piston 12 is furthest from end-wall 50 of cylinder. At this time (i.e. during the time period between when piston 12 stops moving in direction 32 and before it starts moving in direction 34), valve device 58 on the higher pressure (air storage) side of the system 2 and apparatus 10 may close high pressure air passage 54. Alternatively, valve device 58 on the higher pressure (air storage) side of the system 2 and apparatus 10 may close high pressure air passage 54 before piston 12 is closest closed end 40 of cylinder 16 and piston 12 may continue to travel towards end 40 by inertia. Also, it is noted that valve device 56 on lower pressure (air intake/discharge) side of the system 2 and apparatus 10 may close low pressure air passage 52 when piston travels in direction 32.

Now, as a burst of compressed air is introduced into chamber 18 from high pressure air passage 44, the air expands and begins to move piston 12 in direction 34. As piston 12 begins to travel in direction 34, the size of chamber 18 increases during an intake stroke of piston 12 relative to chamber 18. Simultaneously, at the other end of cylinder 16, the size of chamber 20 decreases during a discharge stroke of piston 12 relative to chamber 20. To reduce the resistance to the movement of the piston 12 by air in chamber 20 (which was introduced therein through high pressure air passage 54 when valve device 58 was open and piston 12 was traveling in direction 32), valve device 56 on the on the lower pressure (air intake/discharge) side of the system 2 and apparatus 10 may open low pressure air passage 52 for a discharge of the air from chamber 20. In particular, valve device 56 may be opened when piston 12 is closest end-wall 40 of cylinder 16 such that the air in chamber 20 presents very little, if any, resistance to the movement of piston 12.

Alternatively, valve device 56 may be opened after piston 12 begins moving in direction 34 and when the air pressure within chamber 20 reaches a predetermined maximum threshold. In this manner, a certain amount of air pressure within chamber 20 may be used to provide an air pressure "cushion" against the piston 12 and inhibit piston 12 from contacting end-wall 50.

Referring to FIG. 5, when the piston reaches the end of its travel in direction 34 and is closest end-wall 50 of cylinder 16 (during the time period between when piston 12 stops moving in direction 34 and before it starts moving in direction 32), valve device 56 on the lower pressure (air intake/discharge) side of the system 2 and apparatus 10 may close low pressure air passage 52. Simultaneously, or a fraction of time thereafter, valve device 58 on the higher pressure (air storage) side of the system 2 and apparatus 10 may open high pressure air passage 54 to introduce a burst of compressed air into chamber 20 from compressed air storage reservoir 6.

Additionally, also when piston 12 is closest end-wall 50 of cylinder 16, piston 12 is furthest from end-wall 40 of cylinder. At this time (i.e. during the time period between when piston 12 stops moving in direction 34 and before it starts moving in direction 32), valve device 48 on the higher pressure (air storage) side of the system 2 and apparatus 10 may close high pressure air passage 44. Alternatively, valve device 48 on the higher pressure (air storage) side of the system 2 and apparatus 10 may close high pressure air passage 44 before piston 12 is closest end-wall 50 of cylinder 16 and piston 12 may continue to travel towards end 50 by inertia. Also, it is noted that valve device 46 on lower pressure (air intake/discharge) side of the system 2 and apparatus 10 may close low pressure air passage 42 when piston travels in direction 34.

Now, as a burst of compressed air is introduced into chamber 20 from high pressure air passage 54, the air expands and begins to move piston 12 in direction 32. As piston 12 begins to travel in direction 32, the size of chamber 20 increases during an intake stroke of piston 12 relative to chamber 20. Simultaneously, at the other end of cylinder 16, the size of chamber 18 decreases during a discharge stroke of piston 12 relative to chamber 18. To reduce the resistance to the movement of the piston 12 by air in chamber 18 (which was introduced therein through high pressure side passage 44 when valve device 48 was open and piston 12 was traveling in direction 34), valve device 46 on the on the lower pressure (air intake/discharge) side of the system 2 and apparatus 10 may open low pressure air passage 42 for a discharge of the air from chamber 18. In particular, valve device 46 may be opened when piston 12 is closest end-wall 50 of cylinder 16 such that the air in chamber 18 presents very little, if any, resistance to the movement of piston 12.

Alternatively, valve device 46 may be opened after piston 12 begins moving in direction 32 and when the air pressure within chamber 18 reaches a predetermined maximum threshold. In this manner, a certain amount of air pressure within chamber 18 may be used to provide an air pressure "cushion" against the piston 12 and inhibit piston 12 from contacting end 40. When piston 12 reaches the end of its travel in direction 32, the foregoing cycle may be repeated.

It may be desirable for the air compression process and air expansion process to be isothermal. In other words, the air temperature in the cylinder remains relatively constant. This may be performed by active cooling involving utilizing the piston volume as a thermal storage device which will absorb energy from the air during compression and release heat to the compressed air during expansion.

To better control the sequencing of valves 46, 48, 56 and 58 relative to the position of piston 12, the energy storage and production system 2 may further include a controller 60, as shown in FIG. 1, operable with the first and second valve devices 46, 48 in fluid communication with the first chamber 18, and the first and second valve devices 56, 58 in fluid communication with the second chamber 20.

More particularly, the controller 60 may control a function (e.g. opening and/or closing function) of at least a portion of the valve devices 46, 48, 56, 58 in a sequence with the first reciprocating movement of the piston 12 to transfer the compressed air generated in the first and second chambers 18, 20 to the compressed air storage reservoir 6.

Even more particularly, the controller 60 may control a function (e.g. opening and a closing function) of at least a portion of the valves 46, 48, 56, 58 devices in a sequence to provide the bursts of the compressed air from the storage reservoir 6 introduced into the first and second chambers 18, 20 to generate the second reciprocating movement of the piston.

While a preferred embodiment of the present invention has been described, it should be understood that various changes, adaptations and modifications can be made therein without departing from the spirit of the invention and the scope of the appended claims. The scope of the invention should, therefore, be determined not with reference to the above description, but instead should be determined with reference to the appended claims along with their full scope of equivalents. Furthermore, it should be understood that the appended claims do not necessarily comprise the broadest scope of the invention which the Applicant is entitled to claim, or the only manner(s) in which the invention may be claimed, or that all recited features are necessary.

What is claimed:

1. An energy storage and production system comprising:
   a compressed air energy storage and energy production apparatus comprising
      a free piston within a cylinder, the free piston providing both a magnetic piston comprising a permanent magnet, and a compressed air driven piston;
      a first chamber provided between a first end of the piston and a first end of the cylinder and a second chamber provided between a second end of the piston and a second end of the cylinder, the piston arranged with each end of the cylinder to provide an air compressor and compressed air expander;
      an electromagnetic coil connectable to an input of electrical power and arranged with the piston to generate a first reciprocating movement of the piston, the first reciprocating movement of the piston arranged with controlled opening and closing of each chamber such that air is introduced into each chamber, compressed in the first and second chambers and the compressed air produced in each chamber is thereafter introduced to a compressed air storage reservoir; and
      the electromagnetic coil arranged with the piston to convert a second reciprocating movement of the piston to an output of electrical power connectable to a power grid, the second reciprocating movement of the piston generated by bursts of the compressed air from the storage reservoir introduced into the first and second chambers by controlled opening and closing of fluid communication of each chamber to the compressed air in the storage reservoir.

2. The system of claim 1 further comprising:
   a first air passage and a second air passage in fluid communication with the first chamber; and a first air passage and a second air passage in fluid communication with the second chamber.

3. The system of claim 2 wherein:
the first air passage and the second air passage in fluid communication with the first chamber are adjacent the first end of the cylinder; and
the first air passage and the second air passage in fluid communication with the second chamber are adjacent the second end of the cylinder.

4. The system of claim 2 wherein:
the second air passage in fluid communication with the first chamber is arranged to operate at a higher air pressure than the first air passage in fluid communication with the first chamber; and
the second air passage in fluid communication with the second chamber is arranged to operate at a higher air pressure than the first air passage in fluid communication with the second chamber.

5. The system of claim 2 wherein:
the first air passage and the second air passage in fluid communication with the first chamber are both bidirectional air passages; and
the first air passage and the second air passage in fluid communication with the second chamber are both bidirectional air passages.

6. The system of claim 2 further comprising:
a first valve device to open and close the first passage in fluid communication with the first chamber;
a second valve device to open and close the second passage in fluid communication with the first chamber;
a first valve device to open and close the first passage in fluid communication with the second chamber; and
a second valve device to open and close the second passage in fluid communication with the second chamber.

7. The system of claim 6 further comprising:
a controller operable with the first and second valve devices in fluid communication with the first chamber, and the first and second valve devices in fluid communication with the second chamber.

8. The system of claim 7 wherein:
the controller controls a function of at least a portion of the valve devices in a sequence with the first reciprocating movement of the piston to transfer the compressed air generated in the first and second chambers to the compressed air storage reservoir.

9. The system of claim 8 wherein:
the controller controls at least one of an opening and a closing function.

10. The system of claim 7 wherein:
the controller controls a function of at least a portion of the valves devices in a sequence to provide the bursts of the compressed air from the storage reservoir introduced into the first and second chambers to generate the second reciprocating movement of the piston.

11. The system of claim 10 wherein:
the controller controls at least one of an opening and a closing function.

12. The system of claim 6 wherein:
all the valve devices are bidirectional valve devices.

13. The system of claim 2 wherein:
the second air passage in fluid communication with the first chamber and the second passage in fluid communication with the second chamber are both in fluid communication with a compressed air storage reservoir.

14. The system of claim 1 wherein:
the electromagnetic coil forms part of a wall of the cylinder.

15. The system of claim 1 wherein:
the permanent magnet provides a thermal storage device.

16. A method of energy storage and production comprising:
providing an input of electrical power;
providing a compressed air energy storage and energy production apparatus comprising:
a free piston within a cylinder, the free piston providing both a magnetic piston comprising a permanent magnet, and a compressed air driven piston;
a first chamber provided between a first end of the piston and a first end of the cylinder and a second chamber provided between a second end of the piston and a second end of the cylinder, the piston arranged with each end of the cylinder to provide an air compressor and compressed air expander;
an electromagnetic coil connectable to the input of electrical power and arranged with the piston to generate a first reciprocating movement of the piston, the first reciprocating movement of the piston arranged with controlled opening and closing of each chamber such that air is introduced into each chamber, compressed in the first and second chambers and the compressed air produced in each chamber is thereafter introduced to a compressed air storage reservoir; and
the electromagnetic coil arranged with the piston to convert a second reciprocating movement of the piston to an output of electrical power connectable to a power grid, the second reciprocating movement of the piston generated by bursts of the compressed air from the storage reservoir introduced into the first and second chambers by controlled opening and closing of fluid communication of each chamber to the compressed air in the storage reservoir;
connecting the electromagnetic coil to the input of electrical power and operating the electromagnetic coil with the piston to generate the first reciprocating movement of the piston;
introducing air into the first chamber and the second chamber;
compressing the air in the first chamber and the second chamber with the first reciprocating movement of the piston;
transferring the air compressed in the first chamber and the second chamber to the compressed air storage reservoir;
introducing bursts of compressed air from the storage reservoir into the first and second chambers to generate the second reciprocating movement of the piston; and
operating the electromagnetic coil with the piston to convert a second reciprocating movement of the piston to an output of electrical power connectable to a power grid.

17. The method of claim 16 wherein:
introducing air into the first chamber is performed through a first passage in fluid communication with the first chamber, and transferring the air compressed in the first chamber to the compressed air storage reservoir is performed through a second passage in fluid communication with the first chamber; and
introducing air into the second chamber is performed through a first passage in fluid communication with the second chamber, and transferring the air compressed in the second chamber to the compressed air storage reservoir is performed through a second passage in fluid communication with the second chamber.

18. The method of claim 17 wherein:

the second air passage in fluid communication with the first chamber is arranged to operate at a higher air pressure than the first air passage in fluid communication with the first chamber; and the second air passage in fluid communication with the second chamber is arranged to operate at a higher air pressure than the first air passage in fluid communication with the second chamber.

19. The method of claim 17 further comprising:

a first valve device to open and close the first passage in fluid communication with the first chamber;

a second valve device to open and close the second passage in fluid communication with the first chamber;

a first valve device to open and close the first passage in fluid communication with the second chamber; and a second valve device to open and close the second passage in fluid communication with the second chamber.

20. The method of claim 19 further comprising:

operating a controller with the first and second valve devices in fluid communication with the first chamber, and the first and second valve devices in fluid communication with the second chamber.

21. The method of claim 20 further comprising:

operating the controller to at least one of open and close at least a portion of the valve devices in a sequence with the first reciprocating movement of the piston to transfer the compressed air generated in the first and second chambers to the compressed air storage reservoir.

22. The method of claim 20 further comprising:

operating the controller to at least one of open and close at least a portion of the valves devices in a sequence to provide the bursts of the compressed air from the storage reservoir introduced into the first and second chambers to generate the second reciprocating movement of the piston.

23. The method of claim 16 wherein:

the electromagnetic coil forms part of a wall of the cylinder.

* * * * *